United States Patent
Stessen et al.

(10) Patent No.: US 6,714,258 B2
(45) Date of Patent: Mar. 30, 2004

(54) VIDEO-APPARATUS WITH NOISE REDUCTION

(75) Inventors: Jeroen Hubert Christoffel Jacobus Stessen, Eindhoven (NL); Gerard De Haan, Eindhoven (NL); Robert Jan Schutten, Eindhoven (NL); Fransiscus Wilhelmus Sijstermans, Los Altos, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 373 days.

(21) Appl. No.: 09/808,193

(22) Filed: Mar. 14, 2001

(65) Prior Publication Data

US 2001/0035916 A1 Nov. 1, 2001

(30) Foreign Application Priority Data

Mar. 15, 2000 (EP) ............................................. 00200943

(51) Int. Cl.⁷ .......................... H04N 5/21; H04N 5/213; H04N 5/217
(52) U.S. Cl. ....................... 348/607; 348/624; 348/627; 348/683; 348/701; 382/275
(58) Field of Search ................................. 348/607–624, 348/627, 683, 701, 908; 382/260, 275; H04N 5/21, 5/213, 5/217

(56) References Cited

U.S. PATENT DOCUMENTS

| 4,962,426 A | | 10/1990 | Naoi et al. | |
|---|---|---|---|---|
| 5,049,993 A | * | 9/1991 | LeGall et al. | 348/448 |
| 5,124,657 A | | 6/1992 | Waller, Jr. | |
| 5,285,279 A | * | 2/1994 | Sakamoto et al. | 348/614 |
| 5,400,083 A | | 3/1995 | Mizusawa | |
| 5,448,303 A | * | 9/1995 | Desor et al. | 348/618 |
| 5,929,936 A | * | 7/1999 | Arai et al. | 348/607 |
| 5,982,453 A | * | 11/1999 | Willis | 348/607 |
| 6,064,450 A | * | 5/2000 | Canfield et al. | 375/240.29 |
| 6,144,800 A | * | 11/2000 | Kobayashi | 386/114 |
| 6,173,084 B1 | * | 1/2001 | Aach et al. | 382/260 |
| 6,385,245 B1 | * | 5/2002 | De Haan et al. | 375/240.16 |
| 6,396,876 B1 | * | 5/2002 | Babonneau et al. | 375/240.29 |
| 6,411,341 B1 | * | 6/2002 | De Haan et al. | 348/714 |
| 6,424,749 B1 | * | 7/2002 | Zhu et al. | 382/260 |
| 6,456,328 B1 | * | 9/2002 | Okada | 348/699 |

FOREIGN PATENT DOCUMENTS

| EP | 0444329 A1 | 9/1991 |
|---|---|---|
| EP | 0497222 A2 | 8/1992 |
| EP | 0581059 A2 | 2/1994 |

* cited by examiner

Primary Examiner—John Miller
Assistant Examiner—Brian Yenke

(57) ABSTRACT

A video apparatus includes a circuit for reducing noise in applied input video signals. The noise reducing circuit is provided with a temporal noise filter (S1, LUT, M), a down-sample unit (D) for obtaining a spatial down-sampling of video signals (Vi) of subsequent pixels, these down-sampled video signals being supplied to the temporal noise filter (S1, LUT, M), and an up-sample unit (U) for generating, in response to noise output signals obtained in the temporal noise filter (S1, LUT, M), noise signals of the pixels, and a subtractor (S2) for subtracting the noise signals from the respective input video signals (Vi).

12 Claims, 3 Drawing Sheets

VIDEO-APPARATUS WITH NOISE REDUCTION

BACKGROUND OF THE INVENTION

1. Field of the Invention

The invention relates to a method and device for noise reduction.

2. Description of the Related Art

Noise reduction is generally known, and can be provided using a spatial or temporal noise reduction filter. For example, U.S. Pat. No. 5,400,083 describes a video-apparatus with a spatial noise reduction filter in the form of a vertical recursive noise reduction filter.

European Patent Application No. EP-A-0,497,222, corresponding to U.S. Pat. 5,119,195, discloses a video noise reduction system employing plural frequency bands, in which an input filter separates a luminance input signal into a high frequency component that is noise reduced by coring, and a low frequency component that is noise reduced by a frame recursive filter preceded by sub-sampling and followed by sample rate restoration by interpolation. An output circuit combines the noise reduced components to provide a processed output signal in which high frequency portions thereof are subjected to coring and low frequency portions thereof are subjected to recursive filtering. In a specific application, the frame recursive filter provides a plurality of low frequency sub-sampled components which are combined with the processed output signal in a further output circuit to provide a noise-reduced output signal in a progressive scan form.

European Patent Application No. EP-A-0,581,059 discloses a method of filtering noise in television or video signals by means of a noise reduction circuit having a first input which receives the input signal, and a second input which receives a low-frequency part of a field-delayed output signal of the noise reduction circuit. A decimation filter is present between an output of the noise reduction circuit and the field delay to reduce the data rate of the output signal of the noise reduction circuit. More specifically, the bandwidth is reduced by a factor 2, the data rate is reduced by the same factor, and the bit resolution is reduced from 8 bits to 7 bits. An interpolation filter is present between the field delay and the second input of the noise reduction circuit. The presence of the decimation filter and the interpolation filter allows the use of a field delay with a reduced storage capacity.

Noise reduction can be considered as an averaging process of the signal value of a pixel with that of neighboring pixels of which one has the confidence that they have approximately the same value as the first-mentioned pixel. Small differences are interpreted as noise and may be filtered. Large differences are assumed to be intended and must not be filtered. Spatial noise filtering uses spatial neighbors, i.e., the value of pixels in the immediate vicinity. Strong details will destroy the confidence in neighboring pixel values. Continued spatial filtering in the presence of details causes loss of sharpness, plastic faces, etc.

Video pictures are often quite static. Additive noise is usually random, moving and not static. This makes the noise quite obvious to the eye. By averaging a series of pictures, the picture content adds up and remains the same. The random noise content is uncorrelated and will be reduced according to the number of pictures averaged. Therefore, temporal noise reduction is applied. Temporal noise reduction will clean up the picture without affecting its resolution as long as the pictures are static. Temporal noise filtering uses temporal neighbors: the value of the same pixel in the past or future. The output signal Vo(n) of a known recursive temporal noise filter is a function of the output signal Vo(n−1) and the input video signal Vi(n) according to the relation:

$$Vo(n)=k*Vi(n)+(1-k)*Vo(n-1),$$

with k and 1−k weight factors. The k-factor can be determined by means of a motion detector.

Motion will destroy the confidence in the historic value. Continued temporal filtering in the presence of motion causes motion smear. If a pixel value changes abruptly over time, then it must not be averaged with past values anymore. Protection from smearing can be arranged by using non-linear filtering, i.e., for small temporal differences (k<<1), the present and past values are averaged, and for large differences (k=1), only the present value is used. Temporal averaging removes the temporal high frequencies of the noise, and, thus, it improves the signal-to-noise ratio. It also increases the temporal correlation.

Dynamic noise reduction (DNR) increases the temporal correlation in the picture by temporal low-pass filtering. On a moving picture, this will cause smearing. This is, of course, not desired, so, in the presence of motion, the noise reduction must be switched off. Two kinds of temporal variations must be distinguished, i.e., noise and motion. The threshold may be set according to the current noise level. This is then called "adaptive DNR".

The disadvantage of such a temporal noise reduction filter is that the k-factor can spatially vary strongly. Further, such a filter requires a relatively large field memory and is therefore rather expensive, while peak noise breakthrough can be a disturbing factor.

SUMMARY OF THE INVENTION

It is, inter alia, an object of the invention to provide an improved noise reduction. To this end, the invention provides a video noise reduction circuit comprising a temporal noise filter, a down-sample unit for obtaining a spatial down-sampling of video signals of subsequent pixels, said down-sampled video signals being supplied to the temporal noise filter, an up-sample unit to regenerate, in response to noise output signals obtained in said temporal noise filter, the noise signals of said pixels, and subtracting means for subtracting said noise signals from the respective video signals of the video signal supplying means.

The consequence of this measure is that not only the k-factor is spatially smoothed, but that also the quantity of information in the temporal noise filter is reduced. This, however, does not lead to any major disadvantage, as in the temporal noise filter, only the obtained spatially low frequency filtered noise signals are supplied to the up-sample unit in order to subtract the, most annoying, low frequency noise from to the video input signals. Further, the number of pixels to be stored in the field memory of the temporal noise filter and to be processed in the temporal noise filter is diminished, which lead to a less expensive and less time consuming processing. As the output of the temporal noise filter is a noise signal rather than a video signal, cheap components may be used for the temporal noise filter, the down-sample unit and the up-sample unit.

To increase the video-image quality, a quincunx down-sampling of video signals of pixels is applied, whereby the odd and even lines within a field have a phase difference corresponding with a down-sampling offset of half of the down-sampling ratio of the video signals. In order to obtain a quincunx down-sampling of video signals, the down-sample unit is preferably provided with two non-recursive discrete transversal filters with mutual asymmetric filter coefficients. In a specific embodiment, filter coefficients (1,1,1,0,0)/4 and (0,0,1,1,1,1)/4, respectively, are provided for alternate lines within a field. In this embodiment, video signals of 4 horizontal subsequent pixels are combined in the down-sample unit. However, it will be clear that other filter coefficients and even other filters can be chosen.

In a preferred implementation, the temporal noise filter is formed in such a way that a field memory signal So(m) for a group of down-sampled video signals of subsequent pixels, is a function of the last determined field memory signals So(m−1) for said group of pixels and the down-sampled video input signal Si(m) from the down-sample unit, substantially according to the relation:

$$So(m)=Si(m)-(1-k)*[Si(m)-So(m-1)],$$

where 1-k is a weight factor, depending on the difference signal dif, formed by the difference between the signals Si(m) and So(m−1), the video apparatus further comprising a look-up table (LUT) which, in response to said difference signals dif, provides a noise-representing output signal No(m)=(1−k)*dif, to be supplied to the up-sample unit.

In an alternative implementation, the temporal noise filter is formed in such a way that a field memory signal So(m) for a group of down-sampled video signals of subsequent pixels is a function of the last determined field memory signals So(m−1) for said group of pixels and the down-sampled video input signal Si(m) from the down-sample unit, substantially according to the relation:

$$So(m)=So(m-1)+k*[Si(m)-So(m-1)],$$

where k is a weight factor, depending on the difference signal dif, formed by the difference between the signals Si(m) and So(m−1), the video apparatus further comprising a look-up table (LUT) which, in response to said difference signals dif, provides a motion-representing output signal k*dif, and a subtracting unit by means of which, in response to the in- and output signals of the look-up table (LUT), a noise output signal No(m) to be supplied to the up-sample unit is obtained, this output signal being represented by the relation:

$$No(m)=(1-k)*dif.$$

In the first-mentioned implementation, the output values of the look-up table (LUT) represent "noise signals", these signals directly forming the noise output signals to be supplied to the up-sample unit, while in the latter implementation, the noise output signals to be supplied to the up-sample unit must be derived by subtracting the output signals of the look-up table (LUT), representing "motion", from the input signals dif of the look-up table (LUT), representing "motion+noise".

The LUT in the latter implementation is much larger than in the preferred implementation, because in this alternative implementation, the LUT comprises "motion"-values, while in the preferred implementation, the LUT is provided with "noise"-values. Further, the alternative implementation comprises one adding unit more than the preferred implementation.

These and other aspects of the invention will be apparent from and elucidated with reference to the embodiments described hereinafter.

DESCRIPTION OF THE PREFERRED EMBODIMENTS

Figure 1:
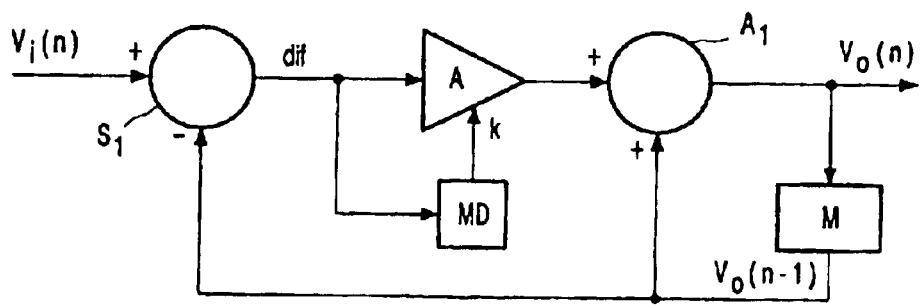
FIG. 1 is a basis block diagram of a prior art implementation of the DNR algorithm.

In the prior art basic block diagram of FIG. 1, the output video signal Vo(n) is a function of the output video signal Vo(n−1) and the input video signal Vi(n) according to the relation:

$$Vo(n)=Vo(n-1)+k*[Vi(n)-Vo(n-1)].$$

k is a weight factor, realized by the amplifier A. The factor k will be dependent on an estimation of the ratio noise versus motion. "Motion" is defined here as larger temporal differences than can be attributed to noise. k is kept small if there is only noise. k will be large (typically k=1) only for intended motion. In FIG. 1, first a temporal difference dif is taken by a subtracter S1 that subtracts the delayed output signal Vo(n−1) from the input signal Vi. This difference dif is attenuated by a factor k, 0<k≦1. The factor k will be derived from the same temporal difference. The attenuated difference, representing "motion", is further integrated by combination with the formerly obtained output signal, stored in the field memory M, to provide for the new output signal. k<1 is recognized as a noise reduction factor. The transfer function of the filter can be represented by:

$$H_k(z) = \frac{k \cdot z}{z - (1 - k)}$$

This is a temporal filter, which if k=1 reduces to an all-pass filter. As k gets smaller, this filter acts more and more as a low-pass filter. For k=0 it becomes a still-picture source (frozen image).

The factor k is obtained by means of a motion detector MD to which the same difference signal Dif is supplied as to the amplifier A. The presence of motion can be determined from the magnitude of the temporal difference signal dif. In that sense, a small value is also an indication that the confidence is high that the changes in the picture are only due to noise. Therefore, a small temporal difference permits strong filtering with a small value for k, while a large temporal difference does not allow noise filtering (k=1). The output signal of the memory M represents a "delayed clean video signal with motion information" Vo(n−1); the difference signal dif represents "motion information and noise"; the output signal of the amplifier A represents "motion information", and the adder A1 generates a combination of the delayed output signal Vo(n−1) with the output signal of the amplifier A that represents "a clean video signal with motion information" Vo.

It may be noticed that k should change per pixel. Only for the parts in the picture that move should k be set to 1. It has been found that k should not change too abruptly; then some spatial filtering is required. This is due to the fact that noise sometimes has a large magnitude and may be mistaken for motion. Such a spatial filtering will be described in the following with reference to FIGS. 2–4.

According to one aspect of the invention, a cheaper solution can be applied by using spatial down-sampling. Then, according to another aspect of the invention, the noise will be subtracted from the video signals of a group of pixels. Therefore, in FIG. 2, a down-sample unit D is inserted. After noise filtering, the separate pixels must be expanded by means of the up-sample unit U. In a simple embodiment of the up-sample unit U, the video signals are repeated a number of times. In the present example, a 4-horizontal down-sampling is applied. This means that, each time, the video signals of 4 pixels are combined. This way of video processing is called spatial down-sampling and is schematically indicated in FIG. 3A. In order to obtain a further reduction of artifacts resulting from imperfect down-sampling and up-sampling, quincunx down-sampling is applied. The odd and even lines within a field have the phase of their down-sampling offset by half of the down-sampled (original) pixels. Care must be taken that the two lines in the original video fields that are processed with the same line of the down-sampled field memory, apply the same phase for the down-sampling. The odd and even down-sampling is illustrated in FIG. 3B. In this embodiment, the down-sampling is realized by means of very simple non-recursive discrete transversal filters with filter coefficients (1,1,1,1,0, 0)/4 and (0,0,1,1,1,1)/4, respectively.

Figure 2:
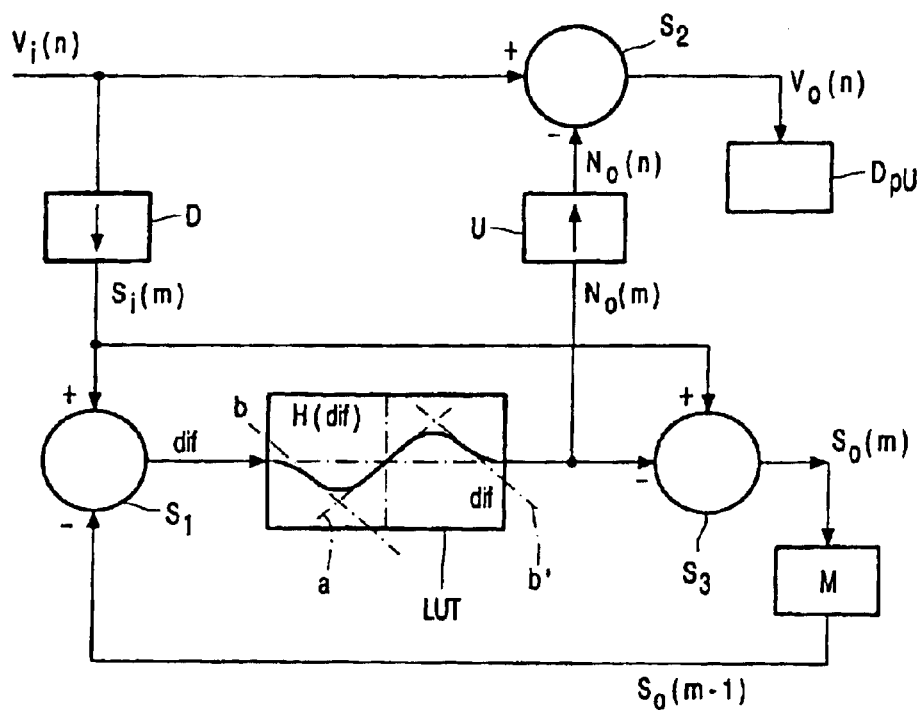
FIG. 2 is a basis block diagram of the DNR algorithm in a preferred implementation according to the invention.
Figure 3A:
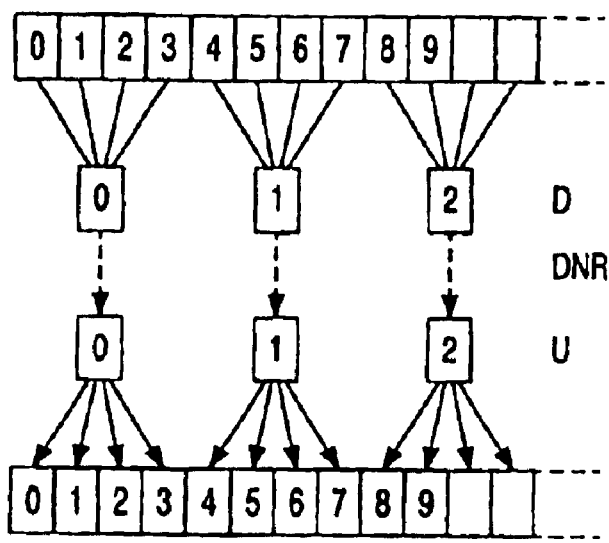
FIGS. 3A and 3B show spatial down-sampling and quincunx down-sampling of video signals of even and odd lines within a field having a phase difference of two pixels.
Figure 3B:
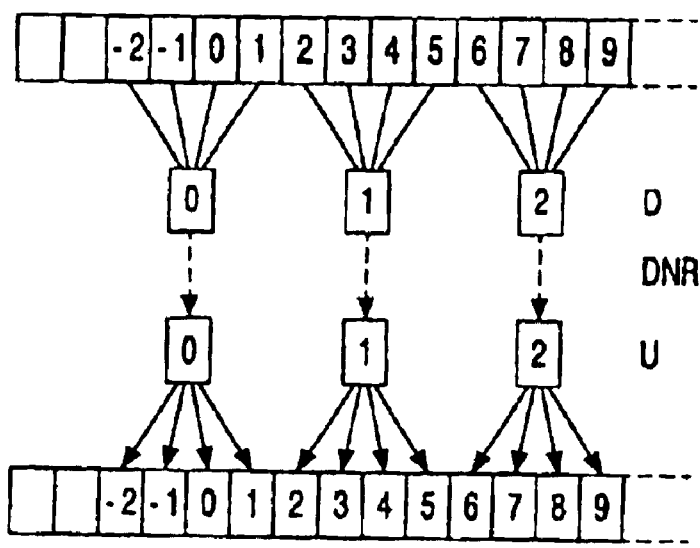

In the embodiment of FIG. 2, the amplifier A with the motion detector MD are replaced by a look-up table (LUT). In this embodiment, for each group of pixels, a value of 1−k is obtained. The gain 1−k is derived from the absolute value of the temporal difference signal dif and is used to set the gain for that same signal dif. In effect, a non-linear function H(dif)=dif*(1−k*|dif|) is generated. As already stated, k must be small (0<k<<+1) for noise and large (k=+1) for motion, then (1−k) quickly goes to zero. The look-up table contains a lot of zeroes, only the center part of the LUT being non-zero. Therefore, it is permitted to clip the input value of the LUT, as a consequence of which the LUT can be strongly limited; temporal differences above a certain value are equally unimportant to the noise metering.

In the embodiment of FIG. 2, the temporal noise reduction filter is formed in such a way that a field memory signal So(m) for a group of down-sampled video signals of subsequent pixels is a function of the last-determined field memory signals So(m−1) for said group of pixels and the down-sampled video input signal Si(m) from the down-sample unit substantially according to the relation:

$$So(m)=Si(m)-(1-k).[Si(m)-So(m-1)],$$

where 1−k is a weight factor, determined by the look-up table (LUT) in response to a difference signal dif, formed by the difference between Si(m) and So(m−1) that is obtained by the subtracter S1. In this embodiment, the values determined by the look-up table (LUT) represent "noise signals" No(m)=dif*(1−k*|dif|) these signals forming the noise output signals to be supplied to the up-sample unit U. A subtracter S3 obtains the difference between the down-sampled input signal Si and the LUT output to obtain the input signal So of the memory M. In the LUT transfer curve, the initial slope, i.e., the slope of line a, (1−k) determines the noise reduction. The slope of lines b and b' is, e.g., −0,5 and determines the loop stability. The slope of the LUT-curve is 0 at both ends, corresponding with the end of the LUT. A noise signal No(m) is up-sampled to a signal No(n), expanded for all the down-sampled video signals and subtracted from the video input signals Vi(n) of the separate pixels, resulting in "clean video signals with motion information" Vo(n) per pixel. These noise-reduced output signals Vo are displayed on a display unit DpU.

Figure 4:
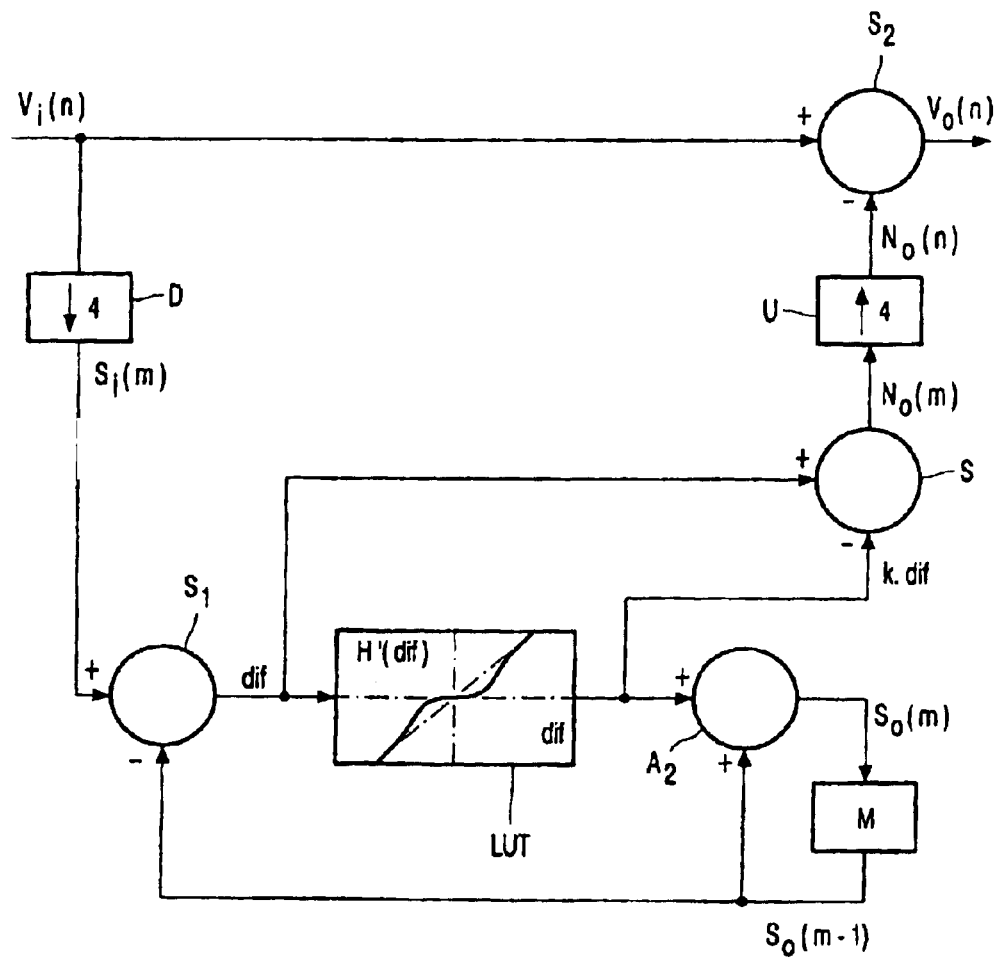
FIG. 4 is a basis block diagram of the DNR algorithm in an alternative implementation according to the invention.

FIG. 4 shows an alternative implementation of a filter according to the invention. Again, a difference signal dif is obtained from a down-sampled video input signal Si(m) and a field memory signal So(m−1), this difference signal dif forming the input signal of the look-up table (LUT) and representing a video signal with motion information and noise. The look-up table (LUT) provides a motion-representing output signal k*dif. The initial slope of the LUT curve is k (k<<1); the end slope thereof is +1. Therebetween, the curve has substantially the form as illustrated in FIG. 4. By means of a subtracting unit S, a noise output signal No(m) is formed from the input and output signals of the look-up table (LUT), this noise output signal No(m) being supplied to the up-sample unit. The noise output signal is represented by the relation:

$$No(m)=(1-k)*dif.$$

Also, in this case, the obtained noise signal No(m) is up-sampled to a signal No(n) and, thus, expanded for all the down-sampled video signals and subtracted from the video input signals Vi(n) of the separate pixels, resulting in "clean video signals with motion information" Vo(n) per pixel. An adder A2 sums the LUT output signal k*dif and the delayed memory output signal So(m−1) to obtain the new memory input signal So.

It will be clear that the invention is not restricted to the embodiments described with reference to accompanying drawings. Particularly, instead of the LUT in the embodiment of FIG. 2, it is possible to use a piecewise-linear function, constructed by three lines with slopes of −1/2, (1−k) and −1/2; the line with the slope (1−k) corresponding with the line a in FIG. 2, the other lines corresponding with the lines b and b' in FIG. 2. The application of such a function cannot be realized in the embodiment of FIG. 4. Further, instead of the field memory M, a frame memory can be used. In fact a field delay can be considered as a form of vertical sub-sampling and leads to a cheaper implementation.

The embodiments described above may be realized by an algorithm, at least part of which may be in the form of a computer program capable of running on signal processing means in a video-apparatus. In so far part of the figures show units to perform certain programmable functions, these units must be considered as sub-parts of the computer program. Particularly the look-up tables can be realized by part of the computer's memory.

Those skilled in the art will thus be able to design many alternative embodiments without departing from the scope of the appended claims. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A video noise reduction device comprising:
   a down-sample unit for spatially down-sampling input video signals to form down-sampled video signals;

a temporal noise filter for filtering the down-sampled video signals to form noise output signals;

an up-sample unit for generating noise signals in response to the noise output signals; and subtracting means for subtracting said noise signals from the respective input video signals to obtain noise-reduced video output signal, characterized in that said down-sample unit applies a quincunx down-sampling of video signals of pixels, whereby odd and even lines within a field have a phase difference corresponding with a down-sampling offset of half of the down-sampling ratio of the video signals.

2. A video noise reduction device according to claim 1, characterized in that the down-sample unit comprises two non-recursive discrete transversal filters with mutual asymmetric filter coefficients for forming a quincunx down-sampling of video signals.

3. A video noise reduction device comprising:

a down-sample unit for spatially down-sampling input video signals to form down-sampled video signals;

a temporal noise filter for filtering the down-sampled video signals to form noise output signals;

an up-sample unit for generating noise signals in response to the noise output signals; and subtracting means for subtracting said noise signals from the respective input video signals to obtain noise-reduced video output signal, characterized in that the temporal noise filter is formed in such a way that a field or frame memory signal (So(m)) for a group of down-sampled video signals of subsequent pixels is a function of the last determined memory signals (So(m−1)) for said group of pixels and the down-sampled video input signal (Si(m)) from the down-sample unit substantially according to the relation:

$$So(m)=Si(m)-(1-k)*[Si(m)-So(m-1)],$$

where 1−k is a weight factor, depending on a difference signal (dif) formed by a difference between the signals (Si(m)) and (So(m−1)), the video-apparatus further comprising a look-up table (LUT) or a piecewise-linear function unit, said look-up table or said piecewise-linear function unit providing, in response to said difference signals (dif), a noise-representing output signal (No(m)=(1−k)*dif), for application to the up-sample unit.

4. A video noise reduction device comprising:

a down-sample unit for spatially down-sampling input video signals to form down-sampled video signals;

a temporal noise filter for filtering the down-sampled video signals to form noise output signals;

an up-sample unit for generating noise signals in response to the noise output signals; and subtracting means for subtracting said noise signals from the respective input video signals to obtain noise-reduced video output siqnal, characterized in that the temporal noise filter is formed in such a way that a field or frame memory signal (So(m)) for a group of down-sampled video signals of subsequent pixels is a function of the last determined memory signals (So(m−1)) for said group of pixels and the down-sampled video input signal (Si(m)) from the down-sample unit (D) substantially according to the relation:

$$So(m)=So(m-1)+k*[Si(m)-So(m-1)],$$

where k is a weight factor, depending on a difference signal (dif) formed by a difference between the signals (Si(m)) and (So(m−1)), the video-apparatus further comprising a look-up table providing, in response to said difference signals (dif), a motion-representing output signal (k*dif), and a subtracting unit for subtracting the input and output signals of the look-up table to form a noise output signal (No(m)) for application to the up-sample unit, said noise output signal (No(m)) being represented by the relation: No(m)=(1−k)*dif.

5. A method of noise filtering comprising the steps:

spatially down-sampling input video signals (Vi) to form down-sampled video signals;

temporally noise filtering the down-sampled video signals to form noise output signals;

up-sampling the noise output signals to generate noise signals, and subtracting said noise signals from the respective input video signals;

characterized in that said down-sampling step applies a quincunx down-sampling of pixels of video signals, wherein odd and even lines within a field have a phase difference corresponding with a down-sampling offset of half of the down-sampling ratio of the video signals.

6. The method of noise filtering as claimed in claim 5, characterized in that in order to obtain a quincunx down-sampling of video signals, the down-sampling step makes use of two non-recursive discrete transversal filters with mutual asymmetric filter coefficients.

7. A video display apparatus, comprising:

a video noise reduction device as claimed in claim 2, and a display unit for displaying the noise-reduced video output signal.

8. A video display apparatus, comprising:

a video noise reduction device as claimed in claim 3, and a display unit for displaying the noise-reduced video output signal.

9. A video display apparatus, comprising:

a video noise reduction device as claimed in claim 4, and a display unit for displaying the noise-reduced video output signal.

10. A video display apparatus, comprising:

a video noise reduction device as claimed in claim 5, and a display unit for displaying the noise-reduced video output signal.

11. A method of noise filtering comprising the steps:

spatially down-sampling input video signals to form down-sampled video signals;

temporally noise filtering the down-sampled video signals to form noise output signals;

up-sampling the noise output signals to generate noise signals, and subtracting said noise signals from the respective input video signals, characterized in that the temporally noise filtering step is performed in such a way that a field or frame memory signal (So(m)) for a group of down-sampled video signals of subsequent pixels is a function of the last determined memory signals (So(m−1)) for said group of pixels and the down-sampled video input signal (Si(m)) from the down-sample unit substantially according to the relation:

$$So(m)=Si(m)-(1-k)*[Si(m)-So(m-1)],$$

where 1−k is a weight factor, depending on a difference signal (dif) formed by a difference between the signals (Si(m)) and (So(m−1)), the temporally noise filtering step further comprising:

generating, in response to said difference signals (dif), a noise-representing output signal (No(m)=(1−k)*dif), for application to the up-sample unit.

12. A method of noise filtering comprising the steps:

spatially down-sampling input video signals to form down-sampled video signals;

temporally noise filtering the down-sampled video signals to form noise output signals;

up-sampling the noise output signals to generate noise signals, and subtracting said noise signals from the respective input video signals, characterized in that the temporally noise filtering step is performed in such a way that a field or frame memory signal (So(m)) for a group of down-sampled video signals of subsequent pixels is a function of the last determined memory signals (So(m−1)) for said group of pixels and the down-sampled video input signal (Si(m)) from the down-sample unit substantially according to the relation:

$$So(m)=So(m1)+k*[Si(m)-So(m-1)],$$

where k is a weight factor, depending on a difference signal (dif) formed by a difference between the signals (Si(m)) and (So(m−1)), the temporally noise filtering step further comprising:

generating a motion-representing output signal (k*diff) in response to said difference signals (dif); and subtracting said motion-representing output signal from said difference signal to form a noise-representing output signal (No(m)=(1−k)*dif), for application to the up-sample unit.

* * * * *